(12) United States Patent
Block et al.

(10) Patent No.: US 6,993,034 B1
(45) Date of Patent: *Jan. 31, 2006

(54) CLUSTER DESTINATION ADDRESS TABLE—IP ROUTING FOR CLUSTERS

(75) Inventors: Timothy Roy Block, Rochester, MN (US); Robert Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/173,090

(22) Filed: Oct. 15, 1998

(51) Int. Cl.
*H04L 12/56* (2006.01)
(52) U.S. Cl. .................. 370/401; 709/245; 370/390
(58) Field of Classification Search ............. 709/249, 709/227, 217, 245, 703, 229, 203; 370/255, 370/386, 399, 401, 389, 392, 390; 379/242, 379/397; 364/200; 711/148, 120; 714/11
See application file for complete search history.

(56) References Cited

U.S. PATENT DOCUMENTS

| | | | |
|---|---|---|---|
| 5,079,767 A | 1/1992 | Perlman | 370/408 |
| 5,361,256 A | 11/1994 | Doeringer et al. | 370/390 |
| 5,371,852 A * | 12/1994 | Attanasio et al. | 709/245 |
| 5,778,187 A | 7/1998 | Monteiro et al. | 709/231 |
| 5,805,572 A * | 9/1998 | Bernabeu-Auban et al. | 370/255 |
| 5,835,723 A | 11/1998 | Andrews et al. | 709/226 |
| 5,850,396 A | 12/1998 | Gilbert | 370/390 |
| 6,047,323 A * | 4/2000 | Krause | 709/227 |
| 6,192,417 B1 * | 2/2001 | Block et al. | 709/249 |
| 6,195,680 B1 * | 2/2001 | Goldszmidt et al. | 709/203 |
| 6,412,079 B1 * | 6/2002 | Edmonds et al. | 714/11 |
| 6,438,652 B1 * | 8/2002 | Jordan et al. | 711/120 |

* cited by examiner

*Primary Examiner*—John Pezzlo
(74) *Attorney, Agent, or Firm*—Steven W. Roth

(57) ABSTRACT

According to the present invention, a communications protocol supporting cluster configurations more complex than a single LAN is disclosed. A cluster destination address table (CDAT) is used in conjunction with a network message servicer to communicate between computer systems in a cluster. Each computer system preferably contains a cluster servicer, a CDAT, and a network message servicer. The CDAT contains network addresses, status and adapter information for each computer system in a cluster. Although computer systems may have alternate network addresses when they have multiple adapters, the CDAT indexes primary and alternate address information under a single named system. Thus, redundant connections amongst computer systems are identified, while still using the numeric addresses upon which the network message servicer is based. To send a message using the methods of the present invention, the cluster servicer retrieves a network address for a computer system from a CDAT. A message to be sent and the retrieved address are passed to the network message servicer, preferably an Internet Protocol suite. The network message servicer formats the information into a packet and routes the packet.

63 Claims, 8 Drawing Sheets

CLUSTER DESTINATION ADDRESS TABLE—IP ROUTING FOR CLUSTERS

BACKGROUND OF THE INVENTION

1. Technical Field

This invention generally relates to clustering computers, and more specifically relates to communications infrastructures for use on computer system clusters.

2. Background Art

Society depends upon computer systems for many types of information in this electronic age. Based upon various combinations of hardware (e.g., semiconductors, circuit boards, etc.) and software (e.g., computer programs), computer systems vary widely in design. Many computer systems today are designed to "network" with other computer systems. Through networking, a single computer system can access information stored on and processed by other computer systems. Thus, networking results in greater numbers of computer systems having access to greater numbers of electronic resources.

Networking is made possible by physical "routes" between computer systems, and the use of agreed upon communications "protocols." What protocol is chosen depends upon factors including the number of networked computer systems, the distances separating the computer systems, and the purposes of information exchange between the computer systems. Communications protocols can be very simplistic if only a few computer systems are networked together at close proximity. However, these communications protocols become more sophisticated as greater numbers of computer systems are added, and as computer systems are separated by greater distances.

The sophistication of communications protocols also varies with the type of information exchange. For instance, some protocols emphasize accuracy in sending large amounts of information, while others emphasize the speed of information transfer. The communications requirements of the applications running on a computer system network determine what type of protocol is chosen. An example of a computer application requiring real-time, reliable information transfer is a "cluster" management application.

Clustering is the networking of computer systems for the purpose of providing continuous resource availability and for sharing workload. A cluster of computer systems appears as one computer system from a computer system user's perspective, but actually is a network of computer systems backing each other up. In the event of an overload or failure on one computer system in a cluster, cluster management applications automatically reassign processing responsibilities for the failing computer system to another computer system in the cluster. Thus, from a user's perspective there is no interruption in the availability of resources.

Clustering is made possible through cluster management application programs running on each computer system in a cluster. These applications relay cluster messages back and forth across the cluster network to control cluster activities. For instance, each computer system in a cluster continuously monitors each of the other computer systems in the same cluster to ensure that each is alive and performing the processing assigned to it. Cluster messaging is also used to distribute updates about which computer systems in the cluster have what primary and back-up responsibilities. Because cluster management requires fast transfer of small amounts of information, the communications protocol employed for cluster messaging must support real-time, reliable information transfer.

Existing protocols that provide real-time, reliable information transfer are typically designed for networks located within a localized area, also called local area networks (LAN's). Clusters of computer systems that use these existing protocols have correspondingly been limited to a network contained within a localized area. Therefore, a key limitation to the clustering of computer systems is that the cluster configuration is limited to one individual LAN.

As more resources become accessible across computer system networks, the demand for continuous access to such network resources will grow. The demand for clusters as a means to provide continuous availability to such network resources will grow correspondingly. Expanding cluster configurations beyond a single LAN requires a communications protocol whose emphasis is on low-latency, real-time, and reliable messaging. However, existing communications protocols for networks more complex than a single LAN (such as wide area networks and internetworks), are not conducive to low-latency, real-time, and reliable messaging required to provide continuous availability of resources over great distances. Without an efficient way to cluster together complex configurations of computer systems, continuous availability of network resources will not be a realizable goal.

DISCLOSURE OF INVENTION

According to the present invention, a communications protocol supporting cluster configurations more complex than a single LAN is disclosed. A cluster destination address table (CDAT) is used in conjunction with a network message servicer to communicate between computer systems in a cluster. Each computer system preferably contains a cluster servicer, a CDAT, and a network message servicer. The CDAT contains network addresses, status and adapter information for each computer system in a cluster. Although computer systems may have alternate network addresses when they have multiple adapters, the CDAT indexes primary and alternate address information under a single named system. Thus, redundant connections amongst computer systems are identified, while still using the numeric addresses upon which the network message servicer is based.

To send a message using the methods of the present invention, the cluster servicer retrieves a network address for a computer system from a CDAT. A message to be sent and the retrieved address are passed to the network message servicer, preferably an Internet Protocol suite. The network message servicer formats the information into a packet and routes the packet.

The methods of the present invention allow a cluster of computer systems to coexist on a public network, while allowing them to remain unaccessible to public nodes. The foregoing and other features and advantages of the invention will be apparent from the following more particular description as set forth in the preferred embodiments of the invention, and as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
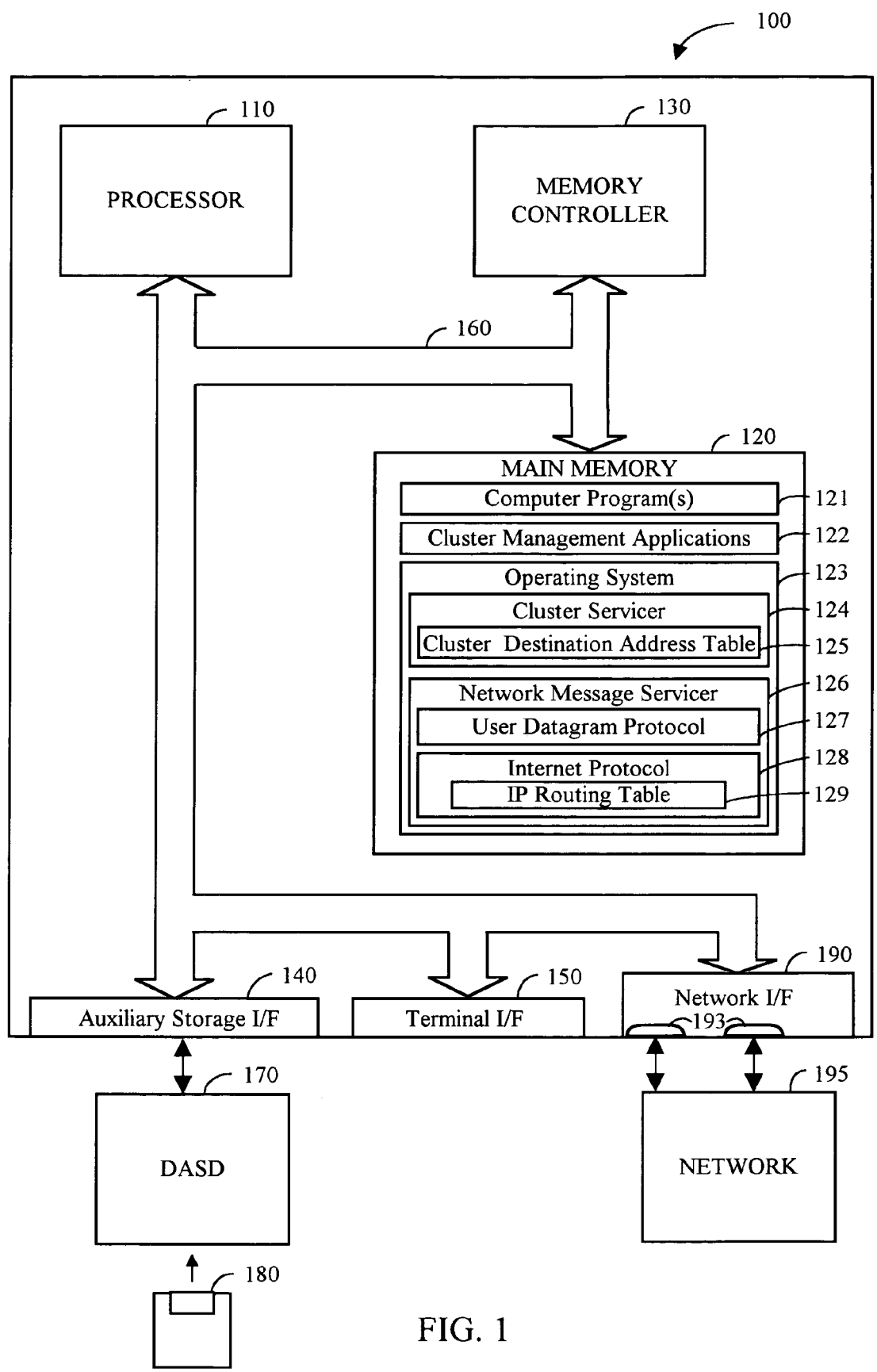
FIG. 1 is a block diagram of an apparatus according to a preferred embodiment of the present invention.

The present invention relates to using the Internet protocol suite in conjunction with a cluster destination address table (CDAT) as the communications infrastructure to support cluster configurations beyond a single local area network (LAN). For those individuals who are not generally familiar with the concepts of clustering, User Datagram Protocol, and Internet Protocol routing over different types of network configurations, the Overview section below presents many of the basic concepts and terminology that will help to understand the invention. Individuals skilled in the art of clustering and Internet routing protocols may skip the Overview and proceed directly to the Detailed Description of this specification.

1. Overview

1a. Clustering

Clustering is the linking together of groups of computers in such a manner, that from the computer user's perspective, the cluster of computer systems appears as one computer system. Clustering is transparent to the users of computer clusters, who need not be aware of whether they are using one computer system or multiple computer systems. Instead, what matters to the users of computer clusters is that they have access to the resources they need, such as databases, printers, files, etc. By clustering computer systems together, continuous availability to necessary resources can be achieved.

There are numerous advantages to clustering computer systems together. First, and most important, clusters provide higher availability by allowing computer systems within a cluster to back each other up. Second, clustering increases scalability, by allowing additional computer systems to be added as needed to improve processing power. Third, workloads can be balanced between computer systems in a cluster.

The computer systems that make up a cluster are also called "nodes." Technically, the term node can refer to processors, communications controllers, or terminals. However for the purposes of a cluster, a node refers to one of the individual computer systems in a cluster. Each node in a cluster is assigned primary and backup responsibilities in support of the cluster. Assigned responsibilities may be for one or for multiple functions such as providing access to data, performing computer applications, or providing access to hardware resources, as in printers, scanners, or fax machines. The nodes in the cluster communicate to ensure that all nodes are functioning, that clustering software on each node is alive and actively monitoring for conditions that would require a switch from primary to backup. Such basic cluster functions are termed "heart beating," that is, low level messaging going between each node to make sure each is alive and healthy.

Primary nodes may be unable to perform their assigned cluster functions because they are taken off-line for administrative or maintenance reasons. Alternatively, a primary node may fail and be unable to perform its functions. In either case, when a node assigned primary responsibility for an assigned function is unable to perform, cluster management applications must act to ensure that the cluster user still has access to the resources assigned to the node that is unable to perform. At a point when one of the nodes does not report back, other nodes are alerted and queried as to their perspective of the silent node. The nodes work together to reach a consensus that it is time to kick out the silent node and transfer its primary responsibilities over to backup nodes. In this manner, the cluster user still has access to needed resources, even when the computer system primarily responsible for providing those resources is unavailable.

1b. Cluster Communications

Custer management applications and a communications infrastructure between all the nodes enable a cluster to operate as a single computer system from a user's perspective. Cluster management applications employ an agreed upon communications protocol to send many small messages between nodes. For instance, messages are sent to every node to inform them about the situation with respect to the other nodes in the cluster. Messages are sent to every node to keep them up-to-date as to what nodes have primary and backup responsibilities for which functions. Messages are sent to every node so that all will be in agreement as to what action to take when one node is unable to perform its assigned responsibilities. Every node in the cluster must receive these cluster messages in the correct order to ensure proper cluster functioning.

Because cluster management requires fast transfer of small amounts of information, the communications protocol employed for cluster messaging must support real-time, reliable information transfer. Such a communications protocol is the subject of the present invention, which employs a cluster destination address table in conjunction with the Internet protocol suite to facilitate cluster messaging.

1b. Internet Protocol Suite

The Internet suite of protocols was developed to allow cooperating computers to share resources across the Internet. However, the Internet protocol suite can be used to share resources across less sophisticated networks as well, including computers within a localized area, also called a local area networks (LAN), computers at different sites, also called a wide area networks (WAN), and networks interconnected together, also called internetworks.

Internet Protocol (IP) and User Datagram Protocol (UDP) are layers of protocols in the Internet protocol suite. The UDP layer provides the basic service of formatting a packet of information to be sent across a network. The IP layer provides the basic service of routing messages to their destinations. Messages can pass through many different networks before getting to their final destination. Yet IP message routing is completely transparent to the user, as long as the user can provide the destination Internet address.

IP routing is based on a numeric "Internet address," which consists of four decimal numbers separated by periods, such as "9.1.1.1." The Internet address can further be broken down into a network address and a host address. In the previous example, the network portion of the address is "9.1.1," and the host address is "1." How much of the Internet address is a network address and how much is a host address varies from network to network. A host is essentially any hardware on a network capable of receiving and transmitting IP messages. With respect to clustering, a host is one of the computer systems (also called nodes) in the cluster.

IP can only route a packet of information to a destination if given a numeric Internet address. If the sender only has the name of a destination, a domain name server (DNS) must be referenced to obtain the numeric address equivalent. Domain name servers are public tables of addresses stored on particular computer systems. The use of a DNS slows down the process of sending a message to a named system. First, a sending computer must send a message to the computer housing the DNS to request the Internet address of the named system. The computer housing the DNS then must send the information back to the requesting computer. Finally, the sending computer can pass the message to be sent to the named system, along with its numeric Internet address to UDP, which formats the information into a packet. UDP then passes the packet to IP, which can route the message.

To route messages, IP in each node keeps a routing table of entries containing network addresses, host addresses, and corresponding routing directions. When IP is asked to route a message, it does a lookup on its routing table for an entry corresponding to the network address portion of the destination Internet address. If a corresponding table entry exists, IP routes the message according to the directions in the routing table.

If IP is running on a host on a network that is interconnected to any other network, IP's routing table will have a default route entry. The default route entry ("*DFTROUTE") provides the Internet address of the node on the local network that serves as the router, or gateway. When IP's routing table contains a default route entry, all messages destined for an Internet address with a network address different from the local network are forwarded to that router, or gateway.

Once the router, or gateway computer receives the message, the IP routing table in that computer repeats the IP routing table lookup procedure, finding either that the message is destined for a computer on a local network to which the node is attached, or that the message needs to be forwarded to the next default router or gateway. In this manner IP can route messages without concern for knowing the physical route that the message must take.

1c. IP Routing Tables for Different Cluster Configurations

The simplest network configuration is a single local area network (LAN), in which all the Internet addresses for all the computers contain the same network number. This type of configuration is also termed as "single subnet." Examples of such networks are token ring networks, or multiple computers on a single Ethernet link. The IP routing table for a single subnet will contain a "direct" routing entry to support communications between nodes. The IP routing table has no default route entry because the single subnet is not connected to any other network.

The next more complex type of network configuration connects computers, which have multiple adapters, together in more than one way. This type of configuration is referred to as nodes being connected by multiple subnets. Each subnet has a different network number and each computer in the configuration is attached to every subnet. Thus, each computer in the configuration has direct access to all other computers in the configuration, regardless of which network number is specified in the Internet address. No default route entry is needed in the IP routing table for nodes connected by multiple subnets when this configuration is not connected to any other network.

The network configurations covered previously are also termed localized. However, once computers are configured such that each computer no longer has direct access to each other computer in the network, the network is no longer localized. The only way to send messages to a computer which is not reachable via a single subnet is to send it through a gateway, or router. A configuration involving gateways might consist of multiple LAN's hooked together by source routing bridges. Alternatively, the configuration might be subnets across a wide area network (WAN) connected by a single router.

For configurations involving single router connections between subnets, the IP routing table contains a default route entry. IP routes messages using the default route when the destination Internet addresses has a network addresses that is not in the IP routing table. The default route address will be that of a routing computer, that is, a computer which is attached both to the local network and to another network. When the message reaches the router, it is then rerouted, either directly to a host within the other network to which the router is attached, or to the next default route. Thus, IP does not need knowledge of physical routes to unknown networks. Instead, IP can route messages to other networks, as long as the IP routing table contains an entry for a default route.

The most complex type of network configuration is subnets across a wide area network (WAN) connected by multiple routers. This configuration creates redundant paths to the subnets, using different routers for each path. IP utilizes the redundant paths, since IP is a hop-by-hop protocol. But the standard IP routing table reflects only one default route. Therefore, the deliberate routing of a message over a redundant path requires additional network management. One way to deliberately route a message to a redundant path is to add entries for the different routers to the standard IP routing table. Alternatively, the deliberate routing of a message over a redundant path requires a communications infrastructure other than the Internet protocol suite, such as routers, a routing protocol, and usually additional network management.

2. Detailed Description

The present invention employs a network message servicer in conjunction with a cluster destination address table (CDAT) as the communications infrastructure to support cluster configurations more complex than a single LAN. Each node in a cluster preferably contains a network message servicer, a cluster servicer, and a copy of a CDAT that contains the numeric network addresses for each node in the cluster.

The cluster servicer on one node sends a cluster message to another node in the cluster by first looking up the other node's network address in the CDAT. Next, the cluster servicer passes the cluster message and the network address to the network message servicer, which formats the information into a packet and assumes responsibility for routing the packet to the destination node.

In this way, the methods of the present invention expand cluster configurations to include nodes on different LAN's without requiring an intervening dedicated LAN connecting the nodes. Computer systems across wide area networks and across internetworks can be clustered together. Because the network address information for these named computer systems is stored on a CDAT and not on a public network name-to-address translator, such as a domain name server, the cluster can exist on a public network, while remaining unaccessible to public nodes.

The CDAT preferably includes primary and alternate network addresses, status, and adapter information for every node in a cluster. Status information includes information about whether a cluster node is reachable or unreachable using the network address. A cluster node may become unreachable when it is unable to perform its primary cluster functions. Adapter information is used for cluster management decisions about which nodes can best provide primary and backup responsibilities in support of the cluster functioning.

Adapter information stored in the CDAT includes subnet mask, adapter type, class of service, and maximum transmission unit (MTU). Subnet mask is used by cluster management to identify what portion of the network address is the subnet address and which portion is the host address. Adapter type provides specific media type information, also known as interconnect fabric information, which is useful to cluster management in making decisions about which nodes can be used to multicast messages, and what retry threshold to assign to an adapter. Retry thresholds indicate the number of failed cluster message attempts allowable before cluster management takes action to kick an unresponsive node out of a cluster. Class of service can be used by cluster management to make decisions about which adapter should be the primary address for a node, and which should be the alternate(s). MTU size is used to optimize the amount of information send through cluster messaging.

The CDAT is preferably identical on all nodes in a cluster. The CDAT is not preferably persistent information and is built up with cluster messaging as each node is added to a cluster. Those skilled in the art will understand that the CDAT does not necessarily have to be a physical table, and can be viewed as a logical collection of the information. In the preferred embodiment of the present invention, the actual information will reside in node objects representing each node in a cluster from any one systems viewpoint.

In the preferred embodiment of the present invention, the Internet Protocol suite serves as the network message servicer. The network addresses in the CDAT are preferably Internet addresses. To send a message to another cluster node, the cluster servicer retrieves the Internet address for the destination node from the CDAT. The cluster servicer then passes the message to be sent and the retrieved Internet address to the User Datagram Protocol. The User Datagram Protocol is the layer of the Internet Protocol suite that formats packets of information to be sent across the Internet. After formatting a packet from the message to be sent and the retrieved Internet address, the User Datagram Protocol passes the packet to the Internet Protocol. The Internet Protocol is the layer of the Internet Protocol suite that routes messages to their destinations.

Referring now to FIG. 1, a computer system 100 in accordance with a preferred embodiment of the present invention is an AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, a main memory 120, a memory controller 130, an auxiliary storage interface 140, a terminal interface 150, and a network interface 190, all of which are interconnected via a system bus 160. Note that various modifications, additions, or deletions may be made to computer system 100 illustrated in FIG. 1 within the scope of the present invention, such as the addition of cache memory or other peripheral devices. FIG. 1 is presented to simply illustrate some of the salient features of computer system 100.

Processor 110 performs computation and control functions of computer system 1100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes computer programs within main memory 120 as needed.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bidirectional communication in a computer-related environment could be used.

Network interface 190 supports the transfer of information between computer system 100 and remote computer systems in network 195. Network interface 190 suitably includes one or more network interface adapters 193, each network interface adapter 193 typically implemented as an expansion card that can easily be added to computer systems such as computer system 100. Examples of network interface adapter 193 include Peripheral Component Interconnect (PCI) expansion cards, Industry Standard Architecture (ISA) expansion cards, proprietary adapter cards, and any types of adapters known now or invented in the future. Those skilled in the art will recognize that the functionality of network interface 190 can be implemented directly as part of main memory and processor 110. Network 195 represents any type of network known to those skilled in the art. This includes the Internet, Intranets, Local Area Networks (LAN's), or any configuration of hardware and software, currently known or developed in the future, by which computer systems communicate with each other.

Main memory 120 suitably contains one or more computer programs 121, cluster management applications 122, and an operating system 123. Computer program 121 in memory 120 is used in its broadest sense, and includes any and all forms of computer programs, including source code, intermediate code, machine code, and any other representation of a computer program. Cluster management applications 122 process administrative requests for the management of a computer cluster. Operating system 123 suitably contains a cluster servicer 124, and network message servicer 126.

Cluster servicer 124 is cluster management software that works in conjunction with network message servicer 126 to provide computer system 100 with a communications protocol that can be used for cluster messaging. Cluster servicer 124 utilizes cluster destination address table 125 in conjunction with network message servicer 126 to send messages to the other cluster nodes in network 195. Network message servicer 126 is a protocol suite, such as the Internet protocol suite. Network message servicer 126 suitably comprises User Datagram Protocol 127 and Internet Protocol 128. User datagram protocol 127 adds standard header formatting to messages to be sent to network 195. Internet protocol 128 uses IP routing table 129 to route the message to network 195.

It should be understood that main memory 120 will not necessarily contain all parts of all mechanisms shown at all times. For example, portions of computer program 121, cluster management applications 122, and operating system 123 may be loaded into an instruction cache (not shown) for processor 110 to execute, while other files may well be stored on magnetic or optical disk storage devices (not shown). In addition, although the computer programs are all shown to reside in the same memory location, it is to be understood that main memory 120 may consist of disparate memory locations. The term "memory" as used herein refers to any storage location in the virtual memory space of system 100.

Figure 2:
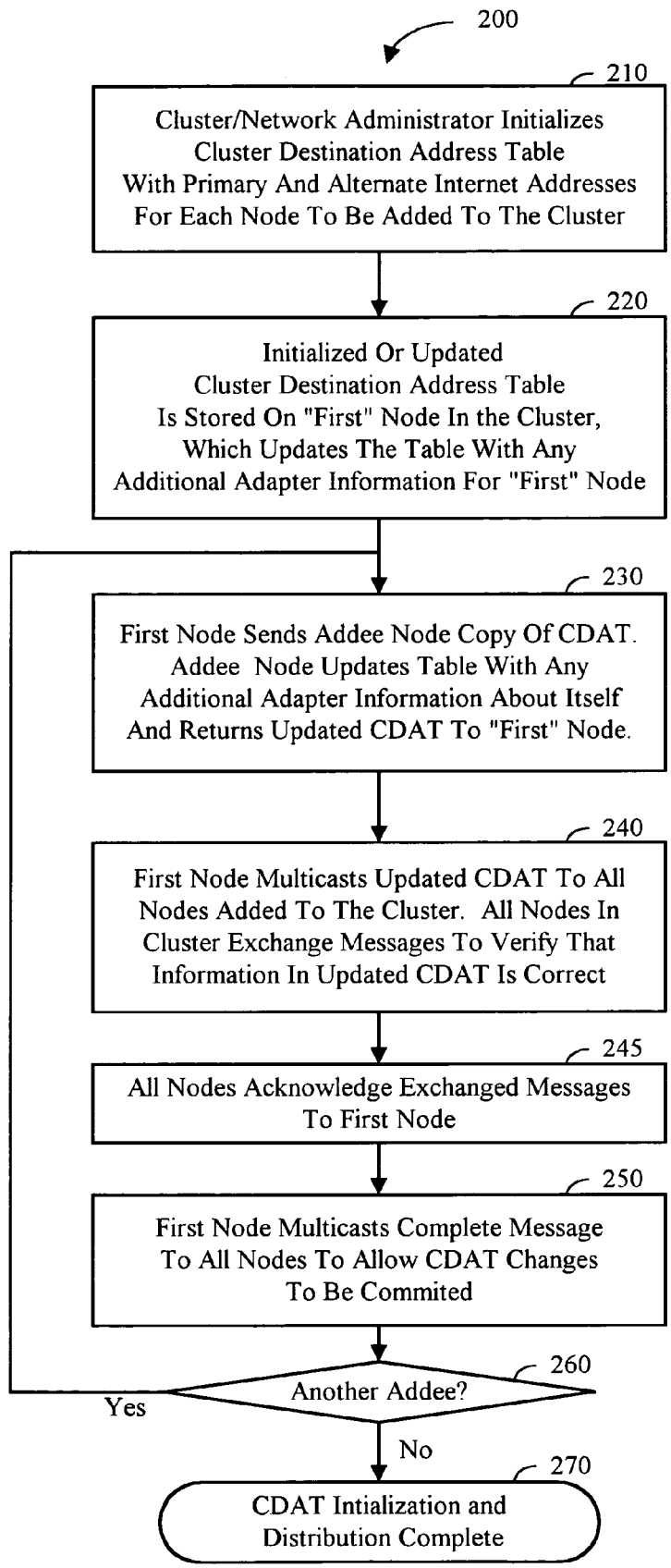
FIG. 2 is a flowchart of a method to initialize and distribute the cluster destination address table (CDAT)

Referring now to FIG. 2, method 200 to initialize and distribute the cluster destination address table (CDAT) according to the preferred embodiment is disclosed. Before nodes in a cluster can communicate with each other using the methods of the present invention, a CDAT is initialized in step 210 by a cluster administrator to contain the primary and alternate Internet address for each named node in the cluster. Alternate Internet addresses are available if a node has multiple adapters. The alternate addresses are indexed in the CDAT under the name of the node, in order to track the addressing information by name and not solely by Internet address.

In this way, the methods of the present invention support name-to-address translation without the use of a domain name server (DNS). Using a CDAT instead of a DNS significantly speeds up address translation and thus speeds up communications between nodes in a cluster. Further, since clustering is the concept of multiple computer systems acting as a single system, the cluster should only be accessible to the outside world as one computer system. Using a CDAT instead of a DNS allows the named systems in a cluster to remain unaccessible to public computer systems co-existing on the same wide area network or on the Internet.

Once step 210 initializes the CDAT, step 220 stores the CDAT on a node given the responsibility of being the first node in the cluster. A cluster servicer running on the first node adds any additional adapter information to the CDAT about the first node. Cluster servicer (CS) then commences the process of adding the remaining nodes to the cluster. Steps 230 through 250 illustrate the process of adding each node to the cluster.

In step 230, the first node references the CDAT for the primary Internet address of a node to be added, termed an "addee." The first node passes a copy of the CDAT in a message to the addee. The addee updates the CDAT with any additional adapter information it has, keeps a copy, and passes the updated CDAT back to the first node. In step 240, the first node then "multi casts" the updated CDAT to all nodes that have thus far been added to the cluster. When the cluster nodes receive an updated CDAT, they exchange messages to ensure that the new addressing information in the CDAT is correct. In step 245, each node acknowledges the exchanged messages to the first node. Upon receiving replies for the exchanged messages, the first node multicasts a "complete" message to all nodes to allow the CDAT changes to be committed.

In step 260, the first node determines if another node needs to be added to the cluster. If so, then steps 230 through 250 are repeated. If not (step 260=No), then all of the nodes have been added to the cluster and each has an identical copy of the CDAT. The CDAT initialization and distribution process is then complete (step 270). To recap, using method 200 the CDAT is updated to reflect all additional adapter information and distributed to all nodes in the cluster. When all nodes have been added to the cluster and each has verified that communications are enabled, cluster servicer can use the CDAT in conjunction with the network message servicer for cluster messaging.

Figure 3:
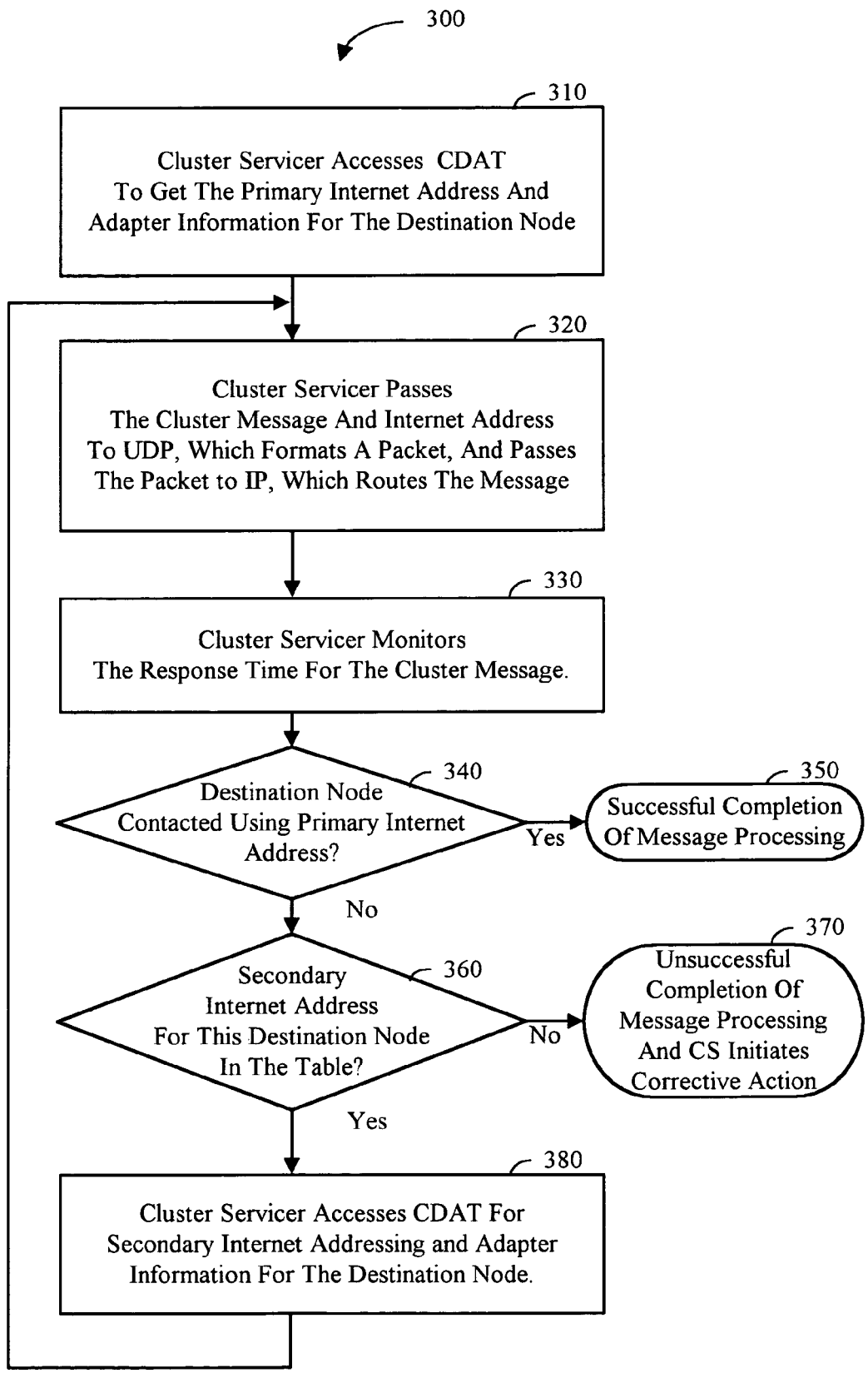
FIG. 3 is a flowchart of a method to send messages between named systems.

Referring now to FIG. 3, method 300 to send messages between nodes in a cluster is disclosed. Cluster servicer (CS) regularly sends messages between nodes in the cluster to support the objectives of maintaining a single system perspective. For instance, CS must send messages to continuously monitor the status of each node. Method 300 is used whenever one node in the cluster needs to send a message to another node in the cluster.

When sending cluster messages, CS accesses the CDAT in step 310 to get the first Internet address and related adapter information listed under the entry for the destination node name. In step 320, CS then passes both the message to be sent and the Internet address to User Datagram Protocol (UDP), which formats the message into a packet. UDP, in turn, forwards the packet to Internet Protocol (IP), which then routes the message to the destination node. In this manner, the Internet protocol suite assumes the overhead of routing cluster messages.

Other than the information stored in the CDAT, no other knowledge of the network routing between nodes in a cluster is needed. For instance, there is no need to rely upon domain name servers (DNS) to translate named addresses into numeric Internet addresses. Instead, this information is stored in the CDAT for every node in the network of named systems. DNS addresses do not change as dynamically as the primary and alternate address information in the CDAT, which makes the CDAT better equipped to serve the needs of cluster messaging. Further, the CDAT provides cluster servicer with a way to control whether primary or secondary Internet addresses are being used in communications between nodes. Finally, reliance upon the CDAT in lieu of a DNS allows cluster configurations to coexist on a public network, while allowing cluster nodes to be unaccessible to public nodes.

In step 330, after the message has been passed to the Internet protocol suite, CS monitors the response time expected for a reply from the destination computer system. Since messages are frequently sent and received amongst nodes, CS keeps information for normal response time for each node, because CS needs to know as quickly as possible that a node is unavailable. Using the methods of the present invention, an abnormal status in a cluster can be determined promptly by the other cluster nodes.

Step 340 determines if the destination node was successfully contacted using the primary Internet address. If so, then method 300 completes with communications to the destination node having been successful (step 350). On the other hand, if CS doesn't hear back from the destination node within an allocated time and/or after re-sending the packet a designated number of times (step 340=No), then step 360 looks in the CDAT for a second Internet address listed under the entry for the destination node name. Subsequent addresses will exist when a cluster node has multiple adapters. If alternate addressing is available for the named node (step 360=Yes, and step 380), CS passes the cluster message with the alternate Internet address to UDP, which formats the message and passes it on to IP to route. That is, steps 320 through 340 are repeated in an effort to reach the destination node via an alternate Internet address. In this manner, redundant connections to the destination node are used only when communications via the primary connection fail. Thus, the CDAT organization efficiently supports cluster communications through the selective use of the Internet addresses for redundant connections.

When messages are not replied to in a timely manner, CS increments a counter to keep track of unsuccessful attempts at communicating with a node via that specific adapter. If unsuccessful attempts exceed a retry threshold stored in the CDAT for that adapter (step 340=No), CS will make cluster management decisions accordingly. For instance, CS might update the status indicator in the CDAT for that adapter as unreachable. When all Internet addresses for a named node in the CDAT have been exhausted (step 360=No), method 300 complete with message processing to the named node have been unsuccessful (step 370).

Those skilled in the art will understand that although methods 200 and 300 have been described using the concepts of Internet address, any type of network address usable by the network message servicer to route messages to their destinations can be stored on the CDAT. Further, although the network message servicer in method 300 has been described to be the Internet protocol suite, those skilled in the art will understand that the network message servicer can be any type of connectionless transport layer protocol software that formats information to be sent across a network and any routing protocol that can route such packets to their destinations.

Figure 4:
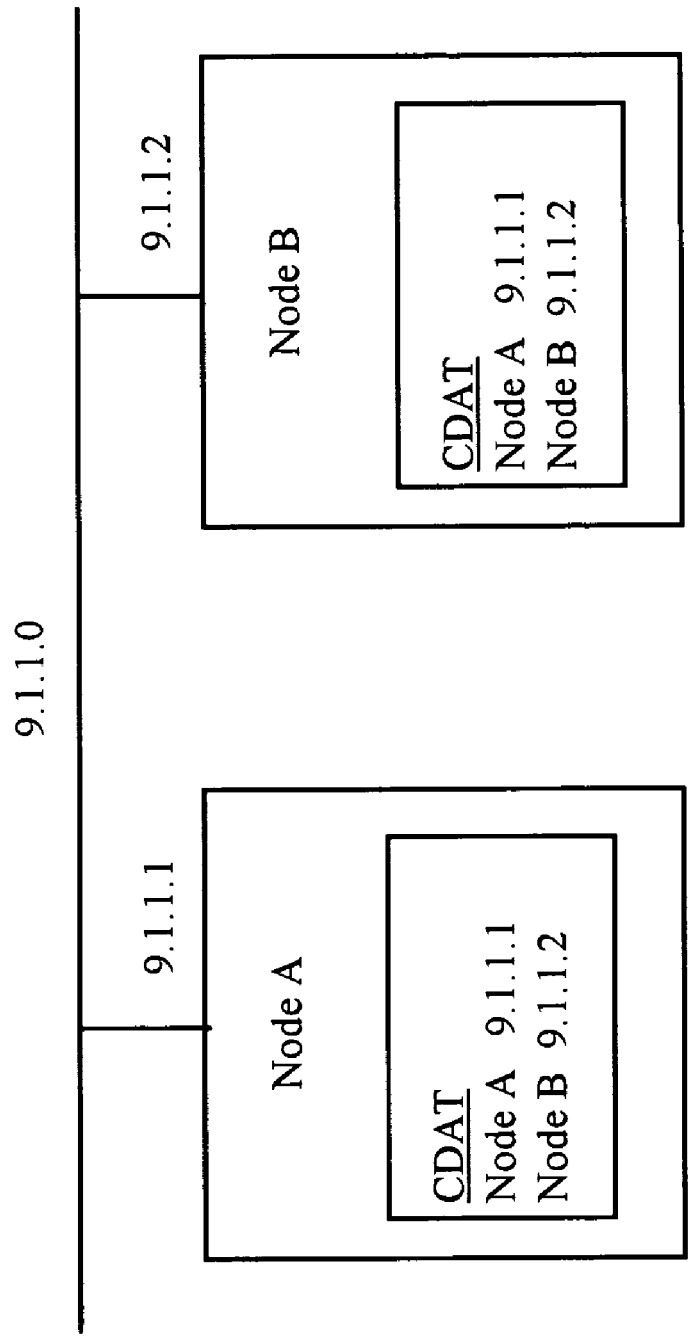
FIG. 4 is a diagram of computers clustered on a single subnet.

By keeping Internet address information in the CDAT and by allowing IP to assume the overhead of routing cluster messages, the cluster communications infrastructure on each cluster node remains very simple. The following discussion provides illustration of how the methods of the present invention work in various cluster configurations. Referring now to FIG. 4, a diagram of computers clustered together on a single subnet is disclosed. From a topology standpoint, it could be multiple nodes on a single token ring, or multiple nodes on a single Ethernet link. Those skilled in the art will recognize that this configuration can be expanded by adding more nodes within the same LAN.

Figure 5:
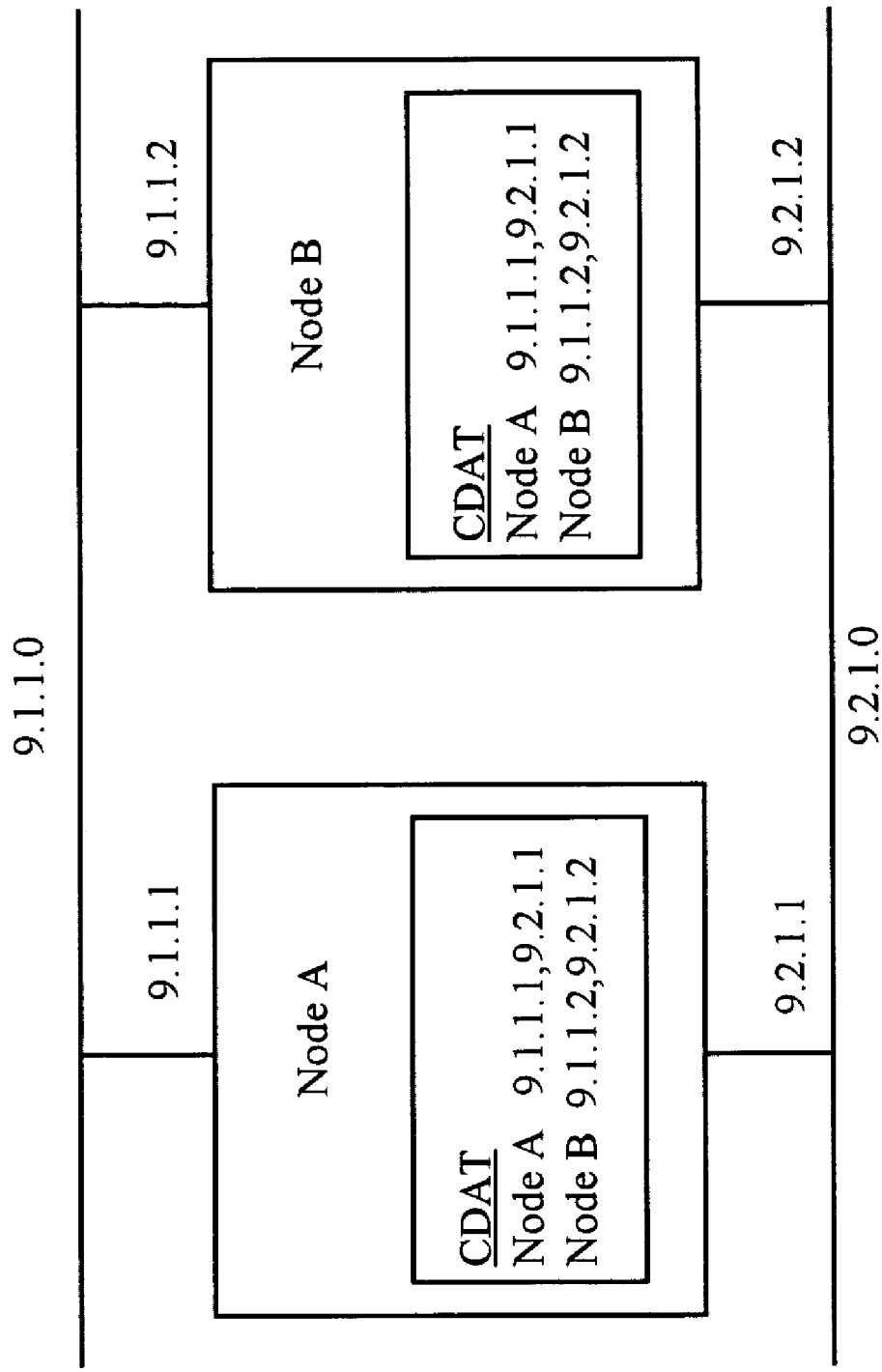
FIG. 5 is a diagram of a cluster consisting of two nodes connected by multiple subnets.
Figure 6:
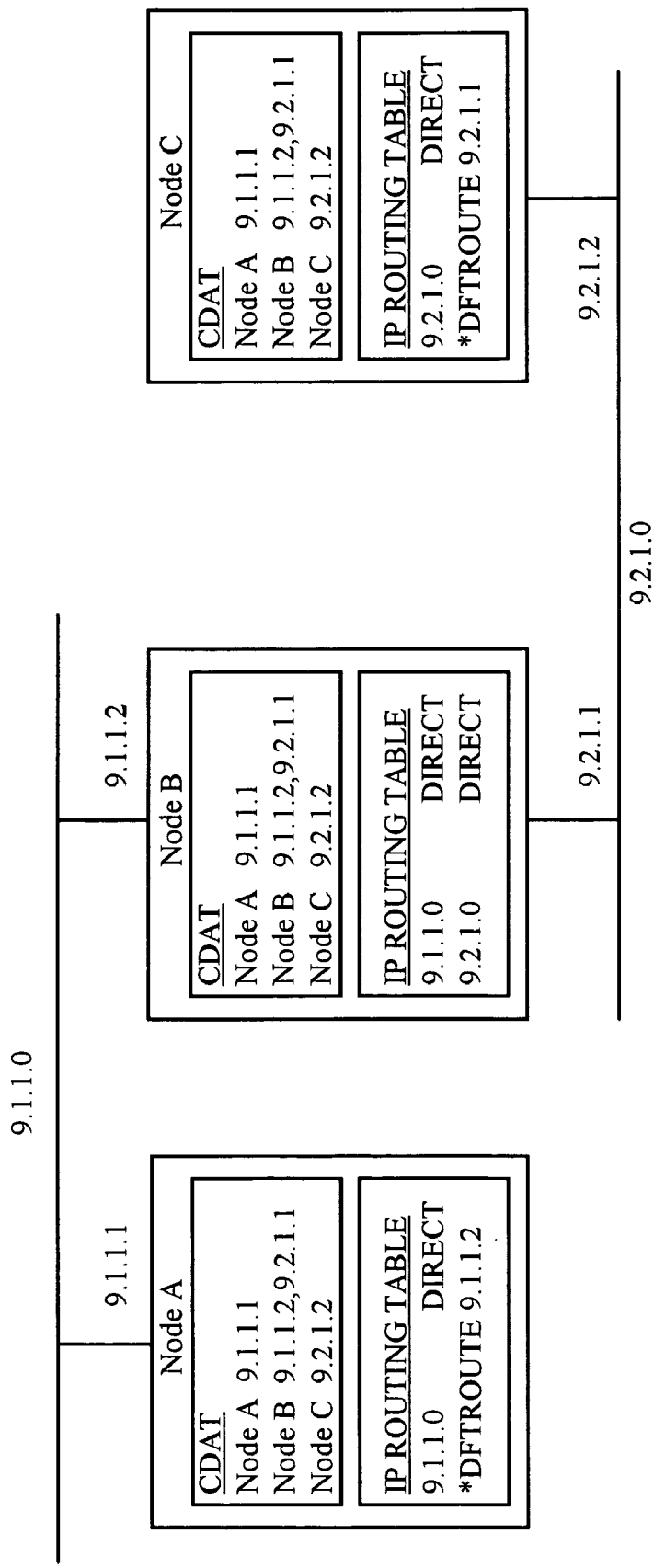
FIG. 6 is a diagram of a cluster configuration where one of the systems in the cluster also serves as a router.
Figure 7:
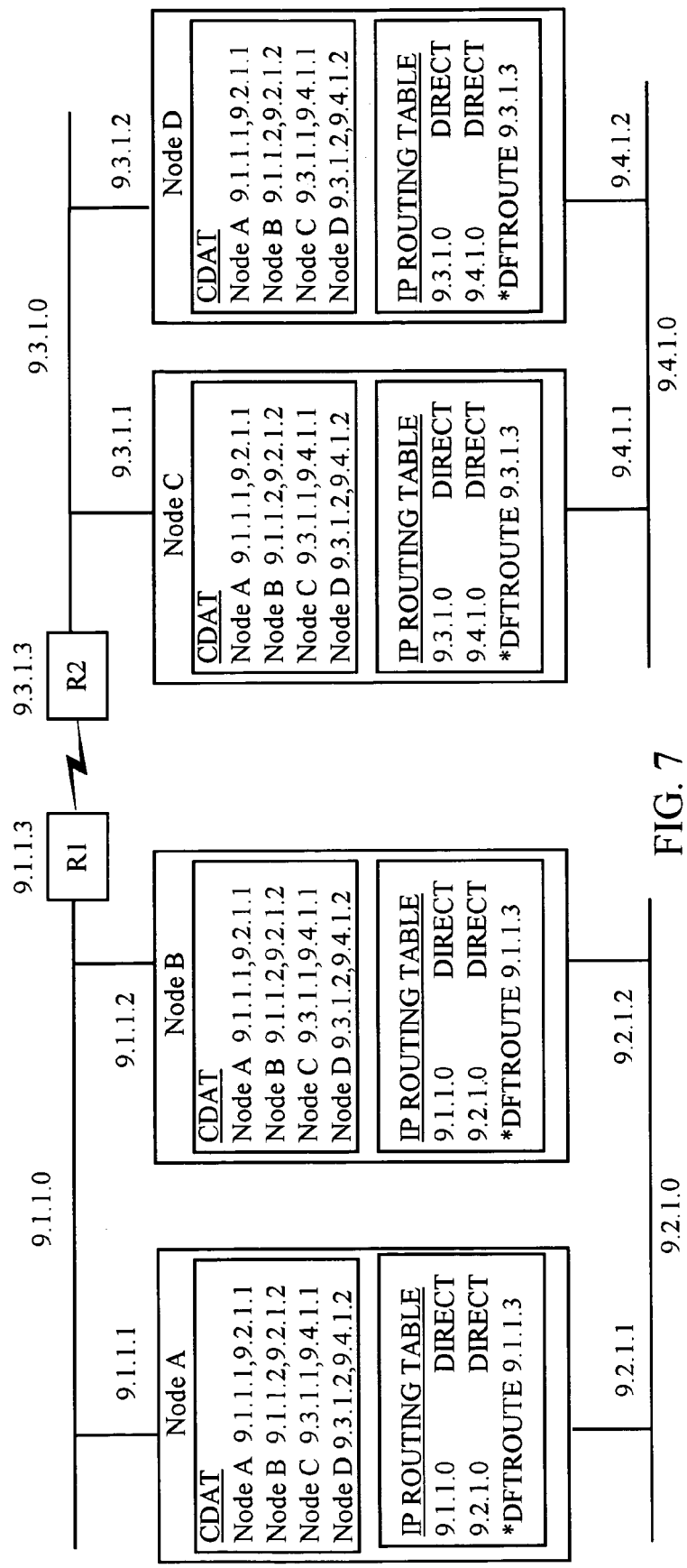
FIG. 7 is a diagram of computers clustered on a wide area network with a single router.
Figure 8:
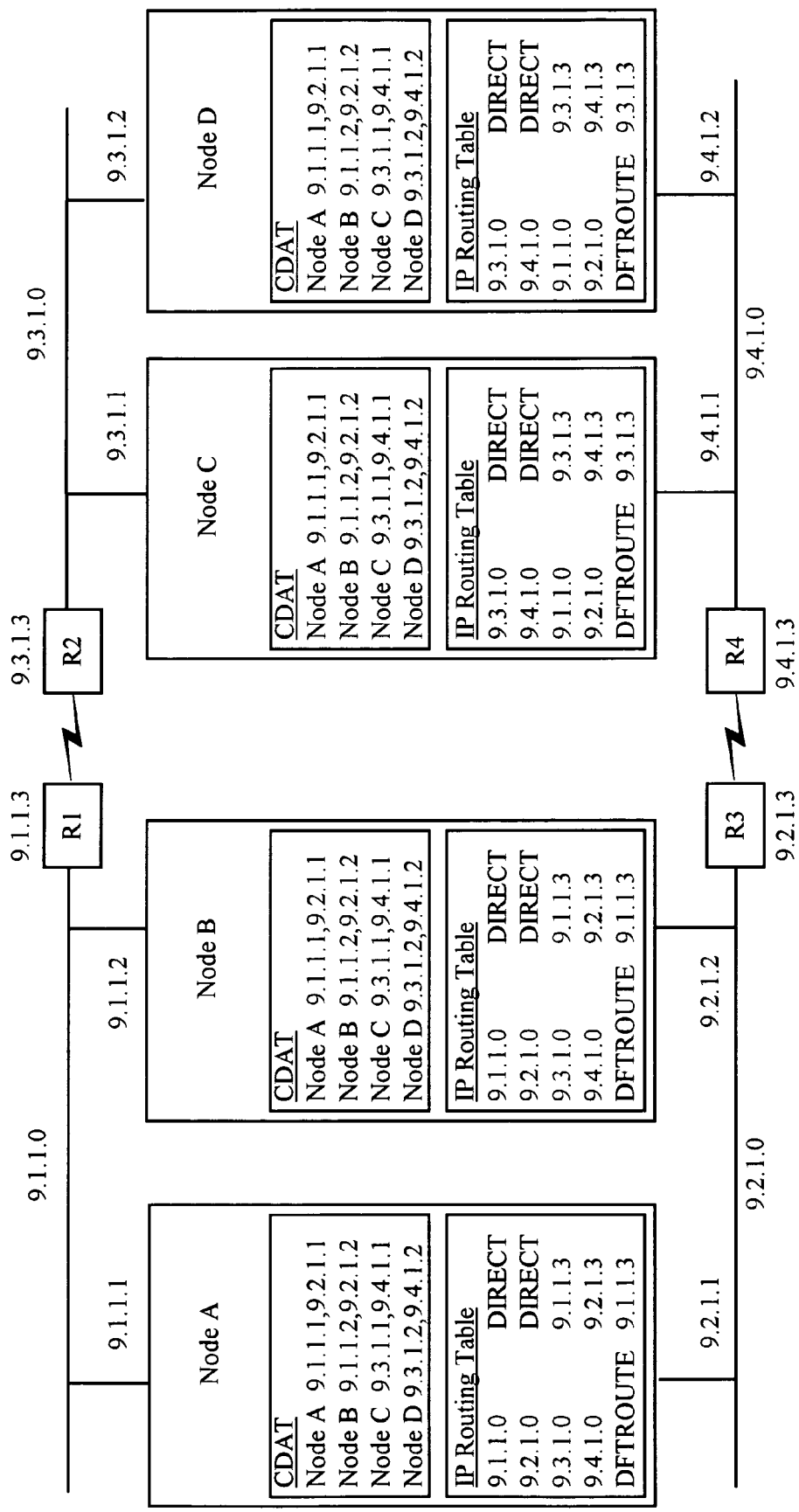
FIG. 8 is a diagram of computers clustered on a wide area network with multiple routers.

In accordance with the preferred embodiment, every node in the cluster (A and B) includes an identical copy of the CDAT. Each node in the cluster is also suitably configured as computer system 100 illustrated in FIG. 1. For instance, each node in the cluster suitably runs cluster management software, referred to in the preferred embodiment as a cluster servicer (CS). And each node contains a copy of UDP and IP. However, for the present purpose of explaining how the CDAT is used amongst nodes in cluster configurations, the CDAT alone is illustrated in each of the nodes in the following examples (FIG. 4 through FIG. 5). As the examples of cluster configurations become more complex, the IP Routing Tables are illustrated in addition to the CDAT (FIG. 6 through FIG. 8).

The CDAT for the configuration illustrated in FIG. 4 has one entry for each of the named nodes in the cluster. Each table entry consists of a node name followed by the Internet addresses for that node. In this example, node A and node B each only have one Internet address, 9.1.1.1 and 9.1.1.2 respectively. The CDAT also contains status and adapter information for each Internet address; however, because this information is not pertinent to show how nodes communicate using the CDAT, the additional adapter information is not shown in this or in the following examples (FIG. 4 through FIG. 8).

When node A wants to send a cluster message to node B, CS running on node A will reference node A's CDAT and find that node B's primary Internet address is 9.1.1.2. Node A's CS passes the message intended for node B along with node B's Internet address to node A's UDP. Node A's UDP forms a packet and passes it on to node A's IP. Node A's IP will then route the message to node B's IP. Node B's IP will pass the message node B's UDP to disassemble the packet and pass the message to node B's CS. In this way, there is no need for any domain name server when sending a message to the system named "node B". Instead, the relation between the named node and its numeric Internet address is stored in the CDAT.

Referring now to FIG. 5, a diagram of a cluster in accordance with the preferred embodiment consisting of two nodes connected by multiple subnets is illustrated. An identical copy of the CDAT exists in each of the named nodes. In this configuration, the CDAT contains both primary and alternate Internet addresses for each node, because each node has multiple adapters. When node A wants to send a cluster message to node B, CS running in node A accesses node A's CDAT and finds 9.1.1.2 to be the primary Internet address for node B. Node A's CS passes the message intended for node B along with node B's primary Internet address to node A's UDP. Node A's UDP formats a packet, which is passed to node A's IP. Node A's IP uses its routing table to find that the host number 9.1.1 is directly connected. Node A's IP then routes the cluster message via network 9.1.1.0 to node B's IP. Node B's IP passes the message to node B's UDP, which disassembles the packet and passes the message to node B's CS. Node B's CS repeats the procedure to send a reply message back to node A.

Meanwhile, node A's CS monitors the reply time from node B. If node A's CS doesn't get a timely reply, node A's CS will again access node A's CDAT and find an alternate Internet address for node B, 9.2.1.2. Node A's CS passes the cluster message intended for node B along with the alternate Internet address to node A's UDP, which formats a packet for 9.2.1.2. Node A's UDP passes the packet to node A's IP, which routes the cluster message to node B using direct routing, this time through network 9.2.1.0. In this manner, the methods of the present invention provide CS with an optimal means to communicate between nodes in a cluster. Node A's CS does not need be concerned with the physical route to node B. Instead, Node A's CS only knows that in this case, there are two ways to address node B, and if one fails, the other may succeed.

Referring now to FIG. 6, a diagram of a cluster configuration in accordance with the preferred embodiment in which one of the nodes in the cluster also serves as a router is illustrated. This configuration is more complex than nodes on a different LAN with a dedicated LAN in between them. Here the only path to node A is on network 9.1.1.0, whereas the only path the node C is on network 9.2.1.0. Yet, the methods of the present invention support cluster messaging between nodes A and C. In this and the following examples (FIG. 6 through FIG. 8), portions of the IP routing tables have been illustrated to show how messages are routed from a named node in one network to a named node in another network.

For the configuration in FIG. 6, no changes are necessary to IP's routing table in support of the methods of the present invention. When subnets such as 9.1.1.0 and 9.2.1.0 contain a router between them, every host on either network has an IP routing table that contains a default route entry. In this case, the router between 9.1.1.0 and 9.2.1.0 is node B. To the host computers on subnet 9.1.1.0, the router address is 9.1.1.2, as can be seen by node A's IP routing table default route (*DFTROUTE) entry. To the host computers on subnet 9.2.1.0, the router address is 9.2.1.1, as can be seen by node C's IP routing table default route (*DFTROUTE) entry.

When IP needs to route a message to a network that is not listed on its IP routing table, IP routes the message according to the default route entry. The default route entry provides the address of the router on the subnet. Further routing of the message is handled by the router. By hopping from one router in one subnet to another router in another subnet, IP can route messages that are destined for other networks.

As shown in FIG. 6, there are two adapters, and correspondingly two Internet addresses for node B, but only one adapter and Internet address for nodes A and C. The CDAT for this configuration reflects the multiple adapters for node B and single adapters for nodes A and C by listing two Internet addresses for node B, and only one Internet address for nodes A and C. When node A wants to communicate with node C, node A's CS references node A's CDAT to find node C's primary Internet address of 9.2.1.2. Node A's CS passes the message intended for node C along with node C's primary Internet address to node A's UDP. Node A's UDP formats the information into a packet and passes it to node A's IP.

Node A's IP breaks down Internet address 9.2.1.2 into subnet address 9.2.1.0 and host address 2. Node A's IP then looks to see if it has routing instructions for subnet 9.2.1.0 in its IP routing table. No entry for subnet 9.2.1.0 exists, so node A's IP routes the message using the *DFTROUTE entry. Since node B is the router for subnet 9.1.1.0, the DFTROUTE entry is set up to send the message to 9.1.1.2 (node B). Node B's IP looks for subnet address 9.2.1.0 and finds an entry in its IP routing table. The routing instructions for 9.2.1.0 tell node B's IP that the connection is direct, and node B's IP is able to route the message to host 2 on that subnet, which is node C's IP. Node C's IP passes the message to node C's UDP, which disassembles the packet and passes the message to node C's CS. Node C's CS repeats the procedure to send a reply message back to node A.

Referring now to FIG. 7, a diagram of computers clustered on a wide area network with a single router in accordance with the preferred embodiment is illustrated. The routers in this configuration are not part of the cluster, nor is there any requirement that they be part of the cluster. When routers are not part of the cluster, no CDAT is stored on them. Yet the methods of the present invention can still be used in conjunction with the Internet protocol suite as the communications protocol for this cluster configuration. Nor are any changes required to the IP routing tables to support this configuration. Portions of the standard IP routing tables are illustrated in FIG. 7 merely to explain how IP default routing works.

When node A wants to communicate with node D, node A's CS will reference node A's CDAT and find that 9.3.1.2 is the primary Internet address listed for node D. Node A's CS will pass the message intended for node D along with node D's primary Internet address to node A's UDP, which formats the information into a packet, and passes it on to node A's IP. Node A's IP will break down the Internet address into a subnet address of 9.3.1.0 and a host address of 2. Node A's IP will search its routing table, not finding an entry for subnet 9.3.1.0. Thus, node A will route the message according to the *DFTROUTE entry in its IP routing table. Node A's default route entry instructs node A's IP to send the message to 9.1.1.3, which is host R1.

R1 uses its standard IP routing table (not shown) to route the cluster message to 9.3.1.3. R2 references its IP routing table and finds that 9.3.1.2 is directly connected. Thus R2 will send the cluster message to node D's IP. Node D's IP will pass the message to node D's UDP, which will disassemble the packet and pass the message to node D's CS. Node D's CS will repeat the procedure to send a reply message back to node A.

Meanwhile, node A's CS will monitor the response time to node D, based on previous communications to node D. If node A's CS does not receive a timely reply, node A will access its CDAT to find an alternate Internet address of 9.4.1.2 for node D. Node A's CS will pass the message intended for node D along with the alternate Internet address to node A's UDP. Node A's UDP will format a packet and pass it to node A's IP. Node A's IP breaks the Internet address into subnet address 9.4.1.0 and host address 2. Node A's IP searches its IP routing table, but finds no entry coded for subnet 9.4.1.0. Node A routes the second packet according to the *DFTROUTE entry in its IP routing table, which sends the message to 9.1.1.3, which is R1.

R1 uses its standard IP routing table (not shown) to route the cluster message to 9.3.1.3. R2 references its IP routing table and finds that subnet 9.4.1.0 is accessible through node C. R2 routes the message to node C's IP, which searches its IP routing table to find that 9.4.1.0 is directly connected. Node C's sends the message to host 2 on subnet 9.4.1.0 (node D). Node D's IP passes the message to node D's UDP, which will disassemble the packet and pass the message to node D's CS. Node D's CS will repeat the procedure to send a reply message back to node A.

Meanwhile, node A's CS keeps track of unsuccessful attempts to communicate with node D. If communications to node D exceed the retry threshold level listed for that Internet address in the CDAT, node A's CS may change the status of node D to unreachable, and the cluster will be managed to provide backup responsibility for the node D's functions. One situation when node D becomes unreachable is when there is a failure somewhere in the connections between R1 and R2. In that case, both nodes C and D would be unreachable by nodes A and B, and partitioned clusters may result.

Partitioned clusters exist if node A and B continue to operate as a cluster, while node C and D operate as a separate cluster. Although all four nodes were meant to be clustered together, any problem in the link between R1 and R2 severs them. While a cluster is partitioned, each of the partitioned clusters provides the resources in its partition to the best of its ability, given the constraints of the partitioning. Once any problem in the link is remedied, CS in any node re-adds nodes from the partitioned cluster back into its cluster. In this example, node A re-adds nodes C and D back into its cluster.

If clusters have been partitioned, re-adding nodes is termed a "merge." Referring back to FIG. 2, node A would execute steps 230 through 250 to re-add node C and D back into the cluster. However, it should be noted that since node C and D are operating as a partitioned cluster, the add process in steps 230 through 250 is simplified. When node A sends node C a copy of the CDAT, node C updates the CDAT adapter information for both itself and node D. Node C already has the adapter information for node D since node C and D have been operating as a partitioned cluster. Thus, steps 230 through 250 need only be executed once in the case of re-adding partitioned clusters.

In all of the cluster configurations illustrated thus far (FIG. 4 through FIG. 7), the standard IP routing table serves the needs of the present invention. That is, no changes need be made to the Internet protocol suite in support of the present invention. However, when multiple routers connect subnets across a WAN, additional entries preferably are added to the IP routing table in each node by the network administrator or cluster administrator to fully implement the methods of the present invention. The problem with the standard IP routing table for this configuration is that it only contains one *DFTROUTE entry to one router. Yet, for the methods of the present invention to make full use of the alternate addresses in the CDAT, one default route entry is insufficient. One default route means that IP does not know that an alternative router can be used to route a cluster message. By adding entries to the IP routing table, however, this problem can be alleviated, and IP in conjunction with the CDAT can still be used as the communications protocol even in this complex network configuration.

Referring now to FIG. 8, a diagram of computers clustered on a wide area network with multiple routers in accordance with the preferred embodiment is illustrated. The IP routing tables for this cluster configuration have additional entries to fully implement the methods of the present invention. Specifically, entries are added for any subnets that are not directly connected, but which contain cluster nodes. The routing instructions for these added entries direct messages to a specific router. In this manner, the methods of the present invention tell IP how to route messages to all subnets which contain cluster nodes, and thus, for such messages IP does not use its default route entry.

When node A wants to send a message to node D, node A's CS accesses its CDAT and finds that 9.3.1.2 is the first Internet address for node D. Node A's CS passes both the message intended for node D along with node D's primary Internet address to Node A's UDP, which formats the information into a packet. Node A's UDP then passes the packet to node A's IP. Node A's IP breaks the Internet address into subnet 9.3.1.0 and host address 2. Node A's IP searches its routing table and finds subnet 9.3.1.0 listed. According to the routing instructions for subnet 9.3.1.0, node A's IP routes the message to 9.1.1.3, which is router R1. Node A's IP sends the message to R1, which routes the message to R2. R2 receives the message and searches its routing table to find that 9.3.1.0 is directly connected, and forwards the message to host 2 on subnet 9.3.1.0, which is node D. Node D's IP passes the message to node D's UDP, which disassembles the packet and passes the message to node D's CS. Node D will repeat the procedure to send a reply message back to node A.

Meanwhile, node A's CS is monitoring the time it takes to get a response from node D. If a timely response is not received, node A's CS will access its CDAT and find an alternate Internet address, 9.4.1.2, for node D. Node A's CS will pass the message intended for node D along with the alternate Internet address to node A's UDP, which packets the information and passes it on to node A's IP. Node A's IP will break the Internet address into subnet address 9.4.1.0 and host address 2. Node A's IP will reference its IP routing table and find an entry listed for subnet 9.4.1.0. Node A sends the messages according to the routing instructions for subnet 9.4.1.0, which specify to send the message to 9.2.1.3, which is R3.

R3 receives the message and references its IP routing table to find that network 9.4.1.0 is accessible by forwarding the message to 9.4.1.3, which is R4. R4's IP receives the message and accesses its IP routing table to find that 9.4.1.0 is directly connected, and sends the message to node D's IP. Node D's IP passes the message to node D's UDP, which disassembles the packet and passes the message to node D's CS. Node D's CS repeats the procedure to send a reply message to node A.

The alternate route to node D through routers R3 and R4 was determined by node A's IP because of entries added to its IP routing table. If additional entries are not added to node A's IP routing table, both the message to the first Internet address listed for node D, 9.3.1.2, and the message to the second Internet address listed for node D, 9.4.1.2, would both have been routed using node A's IP routing table DFTROUTE entry. Since node A's IP routing table default entry instructs node A's IP to send messages to 9.1.1.3, both messages would have been sent via R1 and R2. Had there been a problem with the R1 to R2 link, or with network 9.3.1.0, neither message would have arrived, because without the additional entries to node A's IP routing table, node A's IP has no knowledge of the alternate route to node D using routers R3 and R4. Thus, the addition of entries to the IP routing tables allows the methods of the present invention to support network configurations across WAN's with multiple routers.

The preferred embodiments of the present invention have been explained using different complexities of network configurations as examples. Only for the most complex configuration, a WAN with multiple routers, are any changes necessary to IP's routing table to fully implement the methods of the present invention. The CDAT in conjunction with the Internet protocol suite provide the communications protocol for a network of named systems. An identical copy of the CDAT is stored on each named system in the network, and includes primary and alternate Internet addresses, status and adapter information for each system. By organizing the information by named system, the CDAT provides a means to identify and categorize redundant connections, without any dependence on a domain name server.

Using the methods of the present invention, the scope of cluster implementations can be extended to allow for clusters of privately named nodes which can coexist on a public network. Additionally, since CS uses the CDAT instead of a DNS to locate Internet addresses for nodes in the cluster, nodes in a cluster can remain unaccessible to public nodes. The methods of the present invention allow the Internet protocol suite to assume the overhead for routing messages. In this way, the communications are enabled amongst named nodes in a network, while making full use of existing communications protocols.

While the invention has been particularly shown and described with reference to preferred embodiments thereof, it will be understood by those skilled in the art that various changes in form and details may be made therein without departing from the spirit and scope of the invention.

What is claimed is:

1. An apparatus, said apparatus being a member of a cluster, said apparatus comprising:
at least one processor;
a memory coupled to at least one processor;
a cluster servicer residing in said memory, said cluster servicer facilitating cluster messaging, with at least one other apparatus within said cluster, without requiring an intervening dedicated local area network to said at least one other apparatus.

2. The apparatus of claim 1 further comprising a network message servicer residing in said memory, said network message servicer routing at least one cluster message from said cluster servicer to said at least one other apparatus.

3. The apparatus of claim 2 wherein said network message servicer comprises:
a User Datagram Protocol, said User Datagram Protocol formatting said at least one cluster message to be sent to said at least one other apparatus;
an Internet Protocol, said Internet Protocol routing said at least one formatted cluster message to said at least one other apparatus without requiring an intervening dedicated local area network to said at least one other apparatus.

4. The apparatus of claim 2 wherein said cluster servicer includes a cluster destination address table, said cluster destination address table comprising at least one network address for said at least one other apparatus, and wherein said cluster servicer retrieves said at least one network address for said at least one other apparatus from said cluster destination address table to facilitate cluster messaging with said at least one other apparatus without requiring an intervening dedicated local area network to said at least one other apparatus.

5. The apparatus of claim 4 wherein said cluster destination address table further comprises cluster status information for said at least one other apparatus.

6. The apparatus of claim 4 wherein said cluster destination address table further comprises adapter information for said at least one other apparatus.

7. An apparatus comprising:
at least one processor;
a memory coupled to at least one processor;
a network message servicer residing in said memory; and
a cluster servicer residing in said memory, said cluster servicer including a cluster destination address table, said cluster destination address table including at least one address for at least one other apparatus within said cluster, wherein a message to one of said at least one other apparatus can be sent by said cluster servicer retrieving said at least one address for said at least one other apparatus from said cluster destination address table and passing said retrieved address and said message to said network servicer, wherein said network servicer routes said message to said at least one other apparatus without requiring an intervening dedicated local area network to said at least one other apparatus.

8. The apparatus of claim 7 wherein said cluster destination address table further comprises adapter information for each of said at least one address for at least one other apparatus networked to said apparatus.

9. The apparatus of claim 7 wherein said cluster destination address table further comprises status information for each of said at least one address for at least one other apparatus networked to said apparatus.

10. The apparatus of claim 7 operating as a computer cluster, said computer cluster comprising at least one other apparatus networked to said apparatus, wherein each apparatus in said computer cluster comprises:
at least one processor;
a memory coupled to at least one processor;
a User Datagram Protocol residing in said memory, said User Datagram Protocol formatting at least one packet to be sent between apparatuses in said computer cluster;
an Internet Protocol residing in said memory, said Internet Protocol routing said at least one packet between apparatuses in said computer cluster; and
a cluster servicer residing in said memory, said cluster servicer including a cluster destination address table, said cluster destination address table including at least one Internet address for said each apparatus in said computer cluster, wherein a message can be sent to one of said each apparatus in said computer cluster by said cluster servicer determining one of said at least one Internet address of said one of said each apparatus in said computer cluster from said cluster destination address table and passing said determined Internet address and said message to said User Datagram Protocol, wherein said User Datagram Protocol formats said determined Internet address and said message into at least one packet and passes said at least one packet to said Internet Protocol, wherein said Internet Protocol routes said at least one packet to said one of said each apparatus in said computer cluster.

11. The apparatus of claim 7 wherein said cluster destination address table includes at least one Internet address for said at least one other apparatus networked to said apparatus, and wherein a message to one of said at least one other apparatus can be sent by said cluster servicer retrieving said at least one Internet address for said at least one other apparatus from said cluster destination address table and passing said retrieved Internet address and said message to said network servicer.

12. The apparatus of claim 11 wherein said network message servicer comprises:
a User Datagram Protocol which formats at least one packet from said message and said retrieved Internet address; and
an Internet Protocol, said Internet protocol routing said at least one packet to said one of said at least one other apparatus networked to said apparatus.

13. The apparatus of claim 12 wherein said at least one other apparatus networked to said apparatus is networked through a plurality of routers, and wherein said Internet Protocol comprises specific routing directions indicating which router of said plurality of routers should be used for routing said at least one packet to said at least one other apparatus.

14. A cluster of computers, each computer in said cluster of computers comprising:
   at least one processor;
   at least one network adapter;
   a memory coupled to said at least one processor;
   a User Datagram Protocol residing in said memory, said User Datagram Protocol formatting at least one packet to be sent between computers in said cluster of computers;
   an Internet Protocol suite residing in said memory, said Internet Protocol routing said at least one packet between computers in said cluster of computers; and
   a cluster servicer residing in said memory, said cluster servicer including a cluster destination address table, said cluster destination address table including a cluster destination address table entry for each computer in said cluster of computers, said each cluster destination address table entry comprising:
      an Internet address for each of said at least one network adapter;
      status information for each of said at least one network adapter; and
      adapter information for each of said at least one network adapter;
   wherein said cluster servicer sends a cluster message to a destination computer in said cluster of computers by determining an Internet address for said destination computer from said cluster destination address table entry for said destination computer and passing said determined Internet address of said destination computer and said cluster message to said User Datagram Protocol, wherein said User Datagram Protocol formats said determined Internet address and said cluster message into a packet and passes said packet to said Internet Protocol, wherein said Internet Protocol routes said packet to said destination computer, said Internet Protocol routing said packet to said destination computer without requiring an intervening dedicated local area network to said destination computer.

15. The cluster of computers of claim 14 wherein said Internet Protocol on said each computer in said cluster of computers includes a routing table, said routing table including at least one routing table entry, said at least one routing table entry including a subnet address and corresponding routing direction for said subnet address, and wherein at least one additional routing table entry exists in said routing table for each computer in said cluster of computers that is attached to a plurality of routers, said at least one additional routing table entry including a subnet address and corresponding routing direction for said subnet address that specifies to which router of said plurality of routers to route said at least one packet.

16. The cluster of computers of claim 14 wherein said cluster servicer in each computer in said cluster of computers can employ said cluster destination address table, said User Datagram Protocol, and said Internet Protocol to route all cluster messages necessary to maintain said cluster of computers.

17. The cluster of computers of claim 14 wherein said cluster servicer can determine from said status information in said cluster destination address table whether a network adapter for one of said each computer in said cluster of computers is reachable or unreachable.

18. The cluster of computers of claim 14 wherein said cluster servicer can determine from said adapter information in said cluster destination address table how to assign cluster responsibilities to said each computer in said cluster of computers.

19. The cluster of computers of claim 14 wherein said cluster servicer can determine from said adapter information in said cluster destination address table how to size cluster messages to each network adapter on said each computer in said cluster of computers.

20. The cluster of computers of claim 14 wherein at least one computer in said cluster of computers has a plurality of network adapters, and wherein each cluster destination address table entry corresponding to said at least one computer in said cluster of computers with a plurality of network adapters includes an Internet address for each of said plurality of network adapters, said plurality of Internet addresses ordered preferentially in said cluster destination address table entry, and wherein said cluster servicer can send a cluster message to a destination computer with a plurality of adapters by determining a primary Internet address for said destination computer with a plurality of adapters from said cluster destination address table entry corresponding to said destination computer with a plurality of network adapters.

21. The cluster of computers of claim 20 wherein said cluster servicer can send a cluster message to a destination computer with a plurality of adapters by determining an alternate Internet address for said destination computer with a plurality of adapters from said cluster destination address table corresponding to said destination computer with a plurality of adapters, when a timely response from said destination computer with a plurality of adapters is not received after sending a cluster message addressed to said primary Internet address for said destination computer with a plurality of adapters.

22. A method comprising the steps of:
   creating network address information for each computer in a cluster configuration;
   storing said network address information on said each computer in said cluster configuration; and
   employing said network address information in conjunction with a network message servicer for cluster communications in said cluster configuration beyond a single local area network.

23. The method of claim 22 further comprising the steps of:
   creating routing information for each computer connected to a plurality of routers in said cluster configuration, said routing information identifying which router of said plurality of routers to employ in communicating between said each computer connected to said plurality of routers in said cluster configuration; and
   storing said routing information on each said computer connected to said plurality of routers in said cluster configuration.

24. The method of claim 22 wherein the step of creating network address information for said each computer in said cluster configuration comprises the step of creating a cluster destination address table on said each computer in said cluster configuration, wherein the step of creating said cluster destination address table comprises creating a cluster destination address table entry for said each computer in said cluster configuration, said cluster destination address table entry including at least one network address for a computer in said cluster configuration corresponding to said cluster destination address table entry.

25. The method of claim 24 wherein the step of employing said network address information in conjunction with a network message servicer for cluster communications in said cluster configuration beyond a single local area network comprises the steps of:

retrieving said at least one network address from at least one cluster destination address table entry corresponding to at least one computer in said cluster configuration;

employing said network message servicer to send at least one cluster message to said at least one computer in said cluster configuration by passing said retrieved at least one network address for said at least one computer in said cluster configuration along with said at least one cluster message to a network message servicer, said network message servicer routing said at least one cluster message to said at least one computer in said cluster configuration using said retrieved at least one network address.

26. The method of claim 25 wherein the step of employing said network message servicer to send at least one cluster message to said at least one computer in said cluster configuration comprises the step of passing said retrieved at least one network address for said at least one computer in said cluster configuration along with said at least one cluster message to a User Datagram Protocol, said User Datagram Protocol formatting said retrieved at least one network address for said at least one computer in said cluster configuration and said at least one cluster message into at least one packet, said User Datagram Protocol passing said at least one packet to an Internet Protocol, said Internet Protocol routing said at least one packet to said at least one computer in said cluster configuration.

27. The method of claim 24 wherein the step of creating a cluster destination address table for said each computer in said cluster configuration comprises the step of creating a cluster destination address table entry for said each computer in said cluster configuration, said cluster destination address table entry including a primary network address and at least one alternate network address for said computer in said cluster configuration corresponding to said cluster destination address table entry.

28. The method of claim 27 wherein the step of employing said network address information in conjunction with a network message servicer for cluster communications in said cluster configuration beyond a single local area network comprises the steps of:

retrieving at least one network address from at least one cluster destination address table entry corresponding to at least one computer in said cluster configuration;

employing said network message servicer to send at least one cluster message to said at least one computer in said cluster configuration by passing said primary network address for said at least one computer in said cluster configuration along with said at least one cluster message to a network message servicer, said network message servicer routing said at least one cluster message to said at least one computer in said cluster configuration using said primary network address;

awaiting a reply to said at least one cluster message sent to said at least one computer in said cluster configuration using said primary network address; and employing said network message servicer to send at least one cluster message to said at least one computer in said cluster configuration by passing said at least one alternate network address for said at least one computer in said cluster configuration along with said at least one cluster message to a network message servicer, said network message servicer routing said at least one cluster message to said at least one computer in said cluster configuration using said at least one alternate network address, when said reply to said at least one cluster message sent to said at least one computer in said cluster configuration using said primary network address is not received in a timely manner.

29. The method of claim 22 wherein the step of storing said network address information on said each computer in said cluster configuration comprises the step of storing a copy of said network address information on a first computer in said cluster configuration, said first computer updating said network address information with adapter information about said first computer; said first computer sending a copy of updated network address information to each other computer in said cluster configuration; said each other computer in said cluster configuration updating said network address information with adapter information about said each other computer in said cluster configuration; said each computer in said cluster configuration exchanging said updated network address information such that said each computer in said cluster configuration receives an identical copy of said updated network address information.

30. The method of claim 29 wherein the steps of:

updating said network address information about said first computer comprises the step of updating said network address information with adapter type, maximum transmission unit, subnet mask, and class of service for said first computer; and updating said network address information about said each other computer in said cluster configuration comprises the step of updating said network address information with adapter type, maximum transmission unit, subnet mask, and class of service for each other computer in said cluster configuration.

31. A method of communicating between computers in a cluster comprising the steps of:

creating a cluster destination address table on said each computer in said cluster, said cluster destination address table including a cluster destination address table entry for said each computer in said cluster, said cluster destination address table entry including a primary network address and at least one alternate network address for said computer in said cluster corresponding to said cluster destination address table entry;

storing said cluster destination address table on said each computer in said cluster; and employing said cluster destination address table in conjunction with a network message servicer for communicating between computers in said cluster without requiring an intervening dedicated local area network.

32. The method of claim 31 further comprising the steps of:

adding routing information to said network message servicer for each computer connected to a plurality of routers in said cluster, said routing information identifying which router of said plurality of routers to employ in communicating between said each computer connected to said plurality of routers in said cluster.

33. The method of claim 31 wherein the step of employing said cluster destination address table in conjunction with a network message servicer for communicating between computers in said cluster without requiring an intervening dedicated local area network comprises the steps of:

retrieving at least one primary network address from at least one cluster destination address table entry corresponding to at least one computer in said cluster; and employing said network message servicer to communicate with at least one computer in said cluster by passing said retrieved at least one primary network address for said at least one computer in said cluster along with at least one cluster message to said network message servicer, said network message servicer routing said at least one cluster message to said at least one computer in said using said retrieved at least one primary network address.

34. The method of claim 33 wherein the step of employing said network message servicer to communicate with at least one computer in said cluster comprises the step of passing said retrieved at least one primary network address for said at least one computer in said cluster along with at least one cluster message to a User Datagram Protocol, said User Datagram Protocol formatting said retrieved at least one primary network address for said at least one computer in said cluster and said at least one cluster message into at least one packet, said User Datagram Protocol passing said at least one packet to an Internet Protocol, said Internet Protocol routing said at least one packet to said at least one computer in said cluster.

35. The method of claim 31 wherein the step of storing said cluster destination address table on said each computer in said cluster comprises the step of storing a copy of said cluster destination address table on a first computer in said cluster, said first computer updating said cluster destination address table with adapter information about said first computer; said first computer sending a copy of an updated cluster destination address table to each other computer in said cluster; said each other computer in said cluster updating said cluster destination address table with adapter information about said each other computer in said cluster; said each computer in said cluster exchanging said updated cluster destination address table such that said each computer in said cluster receives an identical copy of said updated cluster destination address table.

36. The method of claim 35 wherein the steps of:
updating said cluster destination address table with adapter information about said first computer comprises the step of updating said cluster destination address table with adapter type, maximum transmission unit, subnet mask, and class of service for each said primary network address and said each at least one alternate network address for said first computer; and
updating said cluster destination address table with adapter information about said each other computer in said cluster comprises the step of updating said cluster destination address table with adapter type, maximum transmission unit, subnet mask, and class of service for each said primary network address and said each at least one alternate network address for said each other computer in said cluster.

37. A program product stored on a computer readable medium that stores the computer code comprising:
(A) a cluster servicer, said cluster servicer facilitating cluster messaging with at least one other computer without requiring an intervening dedicated local area network to said at least one other computer; and
(B) signal bearing media bearing said cluster servicer.

38. The program product of claim 37 wherein said signal bearing media comprises transmission media.

39. The program product of claim 37 wherein said signal bearing media comprises recordable media.

40. The program product of claim 37 further comprising a network message servicer, said network message servicer routing at least one cluster message from said cluster servicer to said at least one other computer.

41. The program product of claim 40 wherein said network message servicer comprises:
a User Datagram Protocol, said User Datagram Protocol formatting said at least one cluster message to be sent to said at least one other computer;
an Internet Protocol, said Internet Protocol routing said at least one formatted cluster message to said at least one other computer without requiring an intervening dedicated local area network to said at least one other computer.

42. The program product of claim 40 wherein said cluster servicer includes a cluster destination address table, said cluster destination address table comprising at least one network address for said at least one other computer, and wherein said cluster servicer retrieves said at least one network address for said at least one other computer from said cluster destination address table to facilitate cluster messaging with said at least one other computer without requiring an intervening dedicated local area network to said at least one other computer.

43. The program product of claim 42 wherein said cluster destination address table further comprises cluster status information for said at least one other computer.

44. The program product of claim 42 wherein said cluster destination address table further comprises adapter information for said at least one other computer.

45. A program product stored on a computer readable medium that stores the computer code comprising:
(A) a network message servicer;
(B) a cluster servicer, said cluster servicer including a cluster destination address table, said cluster destination address table including at least one address for each of a plurality of apparatuses in a computer cluster, wherein a message to one of said plurality of apparatuses can be sent by said cluster servicer retrieving one of said at least one address for said one of said plurality of apparatuses from said cluster destination address table and passing said retrieved address and said message to said network servicer, wherein said network servicer routes said message to said one of said plurality of apparatuses without requiring an intervening dedicated local area network to said one of said plurality of apparatuses; and
(C) signal bearing media bearing said network message servicer and said cluster servicer.

46. The program product of claim 45 wherein said signal bearing media comprises transmission media.

47. The program product of claim 45 wherein said signal bearing media comprises recordable media.

48. The program product of claim 45 wherein said cluster destination address table further comprises adapter information for said each of said plurality of apparatuses.

49. The program product of claim 45 wherein said cluster destination address table further comprises status information for said each of said plurality of apparatuses.

50. The program product of claim 45 comprising:
a User Datagram Protocol, said User Datagram Protocol formatting at least one packet to be sent between said plurality of apparatuses in said computer cluster;
an Internet Protocol, said Internet Protocol routing said at least one packet between said plurality of apparatuses in said computer cluster; and
a cluster servicer, said cluster servicer including a cluster destination address table, said cluster destination address table including at least one Internet address for each of said plurality of apparatuses in said computer cluster, wherein a message can be sent to one of said plurality of apparatuses in said computer cluster by said cluster servicer determining one of said at least one Internet address for said one of said plurality of apparatuses in said computer cluster from said cluster destination address table and passing said determined Internet address and said message to said User Datagram Protocol, wherein said User Datagram Protocol formats said determined Internet address and said message into at least one packet and passes said at least one packet to said Internet Protocol, wherein said Internet Protocol routes said at least one packet to said one of said plurality of apparatuses in said computer cluster.

51. The program product of claim 45 wherein said cluster destination address table includes at least one Internet address for said each of said plurality of apparatuses in said computer cluster, and wherein a message to one of said plurality of apparatuses can be sent by said cluster servicer retrieving one of said at least one Internet address for said one of said plurality of apparatuses from said cluster destination address table and passing said retrieved Internet address and said message to said network servicer.

52. The program product of claim 51 wherein said network message servicer comprises:
 a User Datagram Protocol which formats at least one packet from said message and said retrieved Internet address; and
 an Internet Protocol, said Internet protocol routing said at least one packet to said one of said plurality of apparatuses networked to said apparatus.

53. The program product of claim 52 wherein said at least two of said plurality of apparatuses in said computer cluster are networked through a plurality of routers, and wherein said Internet Protocol comprises specific routing directions indicating which router of said plurality of routers should be used for routing said at least one packet between said two of said plurality of apparatuses in said computer cluster networked together through a plurality of routers.

54. A program product stored on a computer readable medium that stores the computer code comprising:
 a User Datagram Protocol, said User Datagram Protocol formatting at least one packet to be sent between computers in a cluster of computers;
 an Internet Protocol suite, said Internet Protocol routing said at least one packet between computers in said cluster of computers; and
 a cluster servicer, said cluster servicer including a cluster destination address table, said cluster destination address table including a cluster destination address table entry for each computer in said cluster of computers, said each cluster destination address table entry comprising:
  an Internet address for each network adapter;
  status information for said each network adapter; and
  adapter information for said each network adapter;
wherein said cluster servicer sends a cluster message to a destination computer in said cluster of computers by determining an Internet address for said destination computer from said cluster destination address table entry for said destination computer and passing said determined Internet address of said destination computer and said cluster message to said User Datagram Protocol, wherein said User Datagram Protocol formats said determined Internet address and said cluster message into a packet and passes said packet to said Internet Protocol, wherein said Internet Protocol routes said packet to said destination computer without requiring an intervening dedicated local area network to said destination computer.

55. The program product of claim 54 wherein said signal bearing media comprises transmission media.

56. The program product of claim 54 wherein said signal bearing media comprises recordable media.

57. The program product of claim 54 wherein said Internet Protocol includes a routing table, said routing table including at least one routing table entry, said at least one routing table entry including a subnet address and corresponding routing direction for said subnet address, and wherein at least one additional routing table entry exists in said routing table for each computer in said cluster of computers that is attached to a plurality of routers, said at least one additional routing table entry including a subnet address and corresponding routing direction for said subnet address that specifies to which router of said plurality of routers to route said at least one packet.

58. The program product of claim 54 wherein said cluster servicer can employ said cluster destination address table, said User Datagram Protocol, and said Internet Protocol to route all cluster messages necessary to maintain said cluster of computers.

59. The program product of claim 54 wherein said cluster servicer can determine from said status information in said cluster destination address table whether a network adapter for one of said each computer in said cluster of computers is reachable or unreachable.

60. The program product of claim 54 wherein said cluster servicer can determine from said adapter information in said cluster destination address table how to assign cluster responsibilities to said each computer in said cluster of computers.

61. The program product of claim 54 wherein said cluster servicer can determine from said adapter information in said cluster destination address table how to size cluster messages to each network adapter on said each computer in said cluster of computers.

62. The program product of claim 54 wherein at least one computer in said cluster of computers has a plurality of network adapters, and wherein each cluster destination address table entry corresponding to said at least one computer in said cluster of computers with a plurality of network adapters includes an Internet address for each of said plurality of network adapters, said plurality of Internet addresses ordered preferentially in said cluster destination address table entry, and wherein said cluster servicer can send a cluster message to a destination computer with a plurality of adapters by determining a primary Internet address for said destination computer with a plurality of adapters from said cluster destination address table entry corresponding to said destination computer with a plurality of network adapters.

63. The program product of claim 62 wherein said cluster servicer can send a cluster message to a destination computer with a plurality of adapters by determining an alternate Internet address for said destination computer with a plurality of adapters from said cluster destination address table corresponding to said destination computer with a plurality of adapters, when a timely response from said destination computer with a plurality of adapters is not received after sending a cluster message addressed to said primary Internet address for said destination computer with a plurality of adapters.

* * * * *